Jan. 4, 1938.    J. L. HILLIS    2,104,559
CLUTCH MECHANISM FOR TYPEWRITING MACHINES
Filed Sept. 19, 1936

INVENTOR
James L. Hillis
BY
W. M. Wilson
ATTORNEY

Patented Jan. 4, 1938

2,104,559

UNITED STATES PATENT OFFICE 2,104,559

CLUTCH MECHANISM FOR TYPEWRITING MACHINES

James L. Hillis, Rochester, N. Y., assignor to International Business Machines Corporation, New York, N. Y., a corporation of New York Application September 19, 1936, Serial No. 101,531

4 Claims. (Cl. 192—68)

This invention relates to typewriting machines, particularly the power carriage return clutch mechanism.

The principal object of the present invention is to provide a carriage return clutch mechanism which is cheaper to manufacture, more reliable in its operation, and requires less attention by servicemen than prior carriage return clutch mechanisms.

An object is to provide an improved carriage return clutch which is designed to automatically compensate for wear of the clutch facing.

Another object is to provide a carriage return clutch which is easily disassembled for cleaning, repair, or replacement of worn parts.

An object is to provide a carriage return clutch which requires only occasional adjustment which may be effected by a single adjusting means.

A further object is to provide a clutch in which one of the elements comprises a simple disc of material having high frictional characteristics which may be easily replaced without the use of cement, rivets, or other securing means to install the element in the clutch.

An object is to provide a clutch having three engaging elements, two of which engage opposite faces of the third to provide a double gripping action to increase the area of contact and reduce wear.

Other objects, advantages, and features of the invention will be specifically pointed out in the following description and claims or will be apparent from a study of the description, claims, and drawing.

Figure 3:
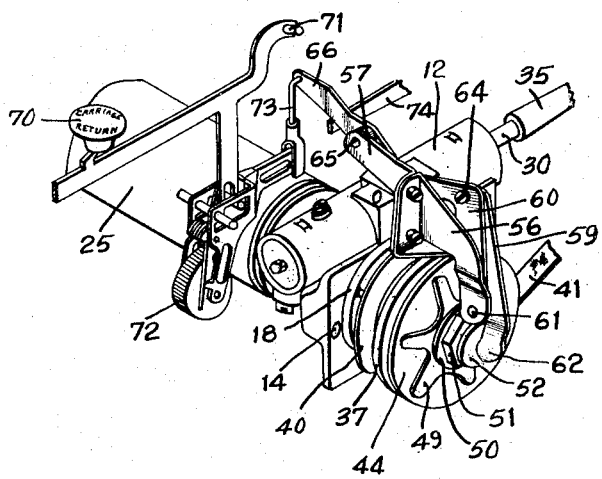
Fig. 3 is a perspective view of the carriage return mechanism.

The numeral 10 designates a portion of the frame of a typewriting machine, for instance, the well known "International" power-operated typewriter (formerly known as the "Electromatic"). This frame has a wide opening or cut-away portion 11 which is open at the bottom. Secured to the inside of the frame 10, in alignment with and covering the opening 11, is a worm drive gear housing 12. This housing is fastened to frame 10 by means of two screws like 13 (Fig. 1) passing through holes in frame 10 adjacent the vertical edges of opening 11 and threaded into tapped holes 14 (Fig. 3) in the housing 12. The frame 10 has not been shown in Fig. 3 in order to avoid the necessity for drawing a major portion of the parts in this figure in dotted lines. The holes in frame 10 for the screws 13 are counterbored to receive the heads of the screws.

A bronze journal 15 is pressed into a hole 16 in the inner or left-hand side of the gear housing while a considerably larger hole 17 concentric with the hole 16, is closed by a shouldered plug 18 into which plug is pressed a bronze journal 19. The journal 19 is in axial alignment with the journal 15 and the two journals support a short shaft 20. The plug 18 is secured to housing 12 by means of two screws (not shown) which are located on diametrically opposite sides of the shaft 20 and fits within the opening 11. In order to prevent the gear housing 12 and the parts carried or partly supported by said housing from dropping when screws 13 are removed, and also to prevent the housing from shifting relative to frame 10, a shouldered pin 21, pressed into a hole in said housing, fits closely but not tightly in a hole in frame 10. Thus the pin 21 and the walls of opening 11 hold the housing 12 against displacement relative to frame 10 yet permit removal of said housing when desired.

The left-hand end of shaft 20 is provided with a transverse hole to receive a short pin 22 which is held in its hole by a set screw 23. The shaft 20 is also somewhat rounded at its left hand end to fit in a tapering hole in a plug 24 which is pressed into the end of the power roller generally designated 25 of which the plug 24 forms a part. The power roller 25, besides plug 24, also includes a metallic tube 26 on which is forced a rubber shell 27, and an oil throw-off ring 28 pressed on the tube 26. The plug 24 has a slot 29 extending transversely of the shaft 20 and engaged by the pin 22 which acts to key shaft 20 to the power roller 25. The left-hand end of the power roller 25 is not shown but is provided in a well known way with suitable means whereby the left-hand end of the power roller may be dropped and drawn to the left to disengage the pin 22 from slot 29 for the purpose of removing the power roller from the machine.

Journaled in the upper part of housing 12, and extending at right angles to shaft 20, is a worm drive shaft 30 having a worm 31 meshing with a worm wheel 32 on shaft 19. The worm wheel is preferably made of some material like hard fibre or a resinous condensation material like "Bakelite" and is spaced from the ends of journals 15, 19 by washers 33 loose on shaft 20. The gear 32 is keyed to shaft 20 by means of a pin 34 which fits loosely in a transverse hole in said shaft and also loosely fits in a slot moulded in the gear. Shaft 30 is connected to the usual driving motor for the typewriting machine, which motor rotates continuously while the machine is in operation, by means of a flexible sleeve 35 (Fig. 3) pressed on the end of shaft 30 and also on the end of the motor shaft. Thus the shaft 20 and hence power roller 25 rotate continually in a clockwise direction (Figs. 2 and 3), while the machine is in use. The housing 12 is filled with a suitable grease for purposes of lubrication.

The shaft 20 projects to the right outside of the frame 10 and the plug 18 has a flange 36 also projecting outside of the frame and concentric with said shaft to provide an annular space between shaft 20 and said plug. Loosely mounted on the shaft 20 is a tape spool or drum 37 having an annular recess 38 into which the flange 36 extends, the hub of the drum extending into the annular space between shaft 20 and the flange. The hub of the drum 37 is spaced from the right hand end of the journal 19 by means of a spacing washer 39 loose on shaft 20.

The drum 37 has a circumferential rectangular groove 40 to provide flanges for guiding the usual typewriter carriage return tape 41 which is wound on the drum 37 between the walls of groove 40. One end of the tape 41 is secured to the drum 37 while the other end is connected to the carriage. Thus rotation of the drum 37 in a clockwise direction (Figs. 2 and 3) results in winding the tape 41 on the drum 37 and draws the typewriter carriage to a position to begin a new line.

Figure 2:
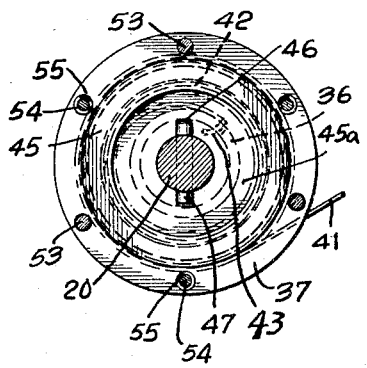
Fig. 2 is a vertical section on line 2—2 of Fig. 1.

In order to keep the tape 41 taut while the carriage is being manipulated by hand or is moving in letter spacing or tabulating direction, a spiral flat spring 42 is provided in the annular recess 38. The outer end of spring 42 is secured to the drum 37 while the inner end is provided with a hook-shaped portion 43 adapted to slip into a slot cut in the flange 36 as shown in Fig. 2. The spring 42 is bent inwardly toward the shaft 20 and is hooked into the slot in flange 36 by first pushing the drum 37 to the left along shaft 20 until the inner end of the spring strikes flange 36 and then rotating the drum in a clockwise direction until the hooked portion slips into the slot in the flange. The drum is then turned by hand until the right spring tension is secured and then the tape is secured to the drum. The spring 42 tends to turn drum 37 in a clockwise direction (Figs. 2 and 3) to wind up the tape but is not strong enough to move the carriage against the tension of the usual spring motor used for producing the letter feeding and tabulating movements of the carriage. When these movements take place, the tape 42 is unwound from the drum 37, turning the latter counterclockwise and winding the spring 42.

The drum 37 is connected to shaft 20 for the purpose of rotating the drum to wind the tape 42, and thus return the carriage, by a novel clutch of which the tape drum may form part. For this purpose the right-hand or outer face of the drum 37 is faced flat at right angles to shaft 20 to form a clutch surface. The clutch comprises two driven elements consisting of the drum 37 and a disc 44 and a driving element 45 located between the driven elements, all mounted on shaft 20.

The driving element 45 consists of a non-metallic disc, preferably made of a relatively stiff material having high frictional characteristics such as the composition lining now commonly used in automobile clutches and brakes. The disc 45 has a round hole loosely receiving shaft 20 and is slotted to provide diametrically opposite key-ways 46 cooperating with a pin 47 loosely mounted in a transverse hole in shaft 20 to key said disc to the shaft. The pin 47 loosely fits the keyways 46 to permit disc 45 to slide on the shaft 20 a small amount for a purpose which will be explained more fully hereinafter.

The disc 44 is not mounted directly on shaft 20 but is part of an assembly which is free to both rotate and slide on said shaft. This assembly consists of a short sleeve 48; the disc 44, which is mounted on the sleeve; a multi-prong spring 49; a washer 50; a nut 51, which is screwed on tightly fitting threads formed in sleeve 48; a thrust cap 52 loosely fitting over the outer end of sleeve 48; and three pins 53. The central hole in disc 44 is counterbored to form a shoulder which cooperates with a shoulder formed in the inner end of sleeve 48. The spring 49 has six prongs which press on the disc 44 near its periphery and is clamped tightly against another shoulder in sleeve 48 by means of the washer 50 and nut 51. The two shoulders in sleeve 48 cooperating with disc 44 and spring 49, respectively, are spaced far enough apart to permit the sleeve 48 to move inwardly or to the left (Fig. 1) relative to disc 44 when the thrust cap 52 is pushed in the same direction and movement of disc 44 is obstructed.

The pins 53 slide freely in holes drilled in the right hand face of the drum 37 and are equally spaced around the periphery of disc 44, as shown in Fig. 2. Disc 44 is also provided with three pins 54, which are also equally spaced around the periphery of the disc equal distances from the pins 53. Pins 54 are considerably shorter than the pins 53 so as to be incapable of touching the drum 37 and act merely as retainers for coil springs 55 which are interposed between the drum 37 and disc 44. Springs 55 press the driven elements 37, 44 of the clutch apart and thus oppose movement of these elements relative to each other to engage them with the driving element 45 by pushing the thrust cap 52 and sleeve 48 to the left. Pins 53 couple the driven elements 37, 44 together so that both must move in unison when the clutch is engaged. Normally disc 45, the driving element of the clutch, rotates freely between the driven elements 37, 44, sufficient clearance being provided between the parts for this purpose.

Figure 1:
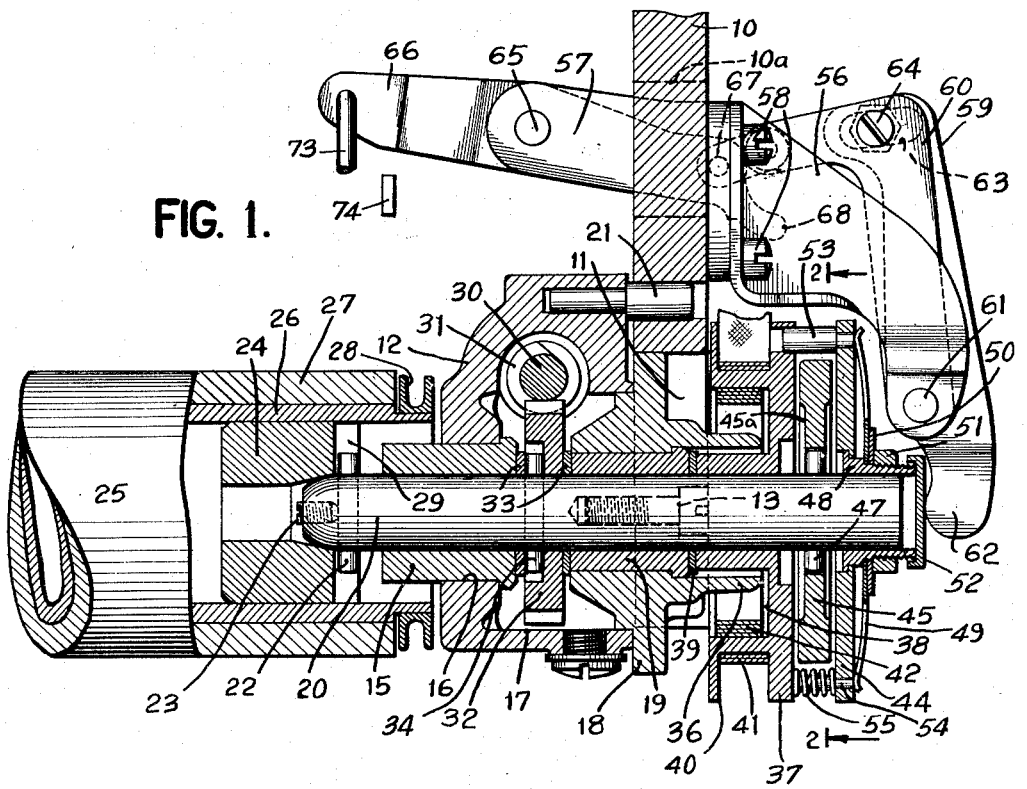
Fig. 1 is a large scale vertical section through the clutch.

When the thrust cap 52 is pushed inwardly, that is, toward the left in Fig. 1, the assembly carried by sleeve 48 moves inwardly and, after, a small amount of idle movement due to the clearances, disc 44 presses the disc 45 firmly against the face of the drum 37. If now the sleeve 48 is pressed still further inwardly spring 49 yields and permits the sleeve to move relatively to disc 44 whereby the coacting shoulders in the disc 44 and sleeve 48 separate by the amount of the excess movement of the sleeve. Thus the three elements 37, 44, 45 will be held in engagement by spring 49 and the tape drum 37 will be rotated by shaft 20 to wind the tape 42 and return the carriage.

Secured to frame 10, adjacent an opening 10a in said frame, are two brackets 56, 57, both being fastened to the frame by a common pair of screws 58. Bracket 56 extends downwardly from frame 10 to a point slightly above the outer end of sleeve 48, at which point is pivoted one member of a two part lever 59, 60. Both of the members 59, 60 are loosely mounted on a pivot pin 61 riveted to bracket 56. The member 59 has a round-nosed arm 62 engaging the center of the thrust cap 52 and its upper end has a slot 63 which is curved concentrically with the pivot pin 61. The member 60 is L-shaped, with its longer arm pivoted by the pin 61, while at the apex formed by the two arms there is provided a bolt 64 passing through a round hole in member 60 and the slot 63 in member 59. Thus the two members 59, 60 are rigidly connected together to form an operating lever, one of whose arms is adjustable relative to the other.

Bracket 57 is bent inwardly through the opening 10a to a point directly above the housing 12. At this point a pivot pin 65 is riveted to the bracket 57 and supports a toggle lever 66 which extends outwardly through the opening 10a. A pair of toggle links 67, only one of which is shown in Fig. 1, interconnects the lever 66 with the shorter arm of member 60.

When the inner or left-hand arm of toggle lever 66 is drawn downwardly, the toggle comprising the outer arm of lever 66 and the pair of links 67 is straightened and moved slightly beyond the dead center position of the toggle, the off dead-center movement being limited by a curved extension 68 formed in lever 66 engaging the shorter arm of member 60. This causes the two part lever 59—60 to rock clockwise (Fig. 1) and push the thrust cap 52 inwardly to engage the clutch elements. The reaction of spring 49 back through the sleeve 48 and lever 59—60 causes the toggle to lock beyond its dead center position with extension 68 engaging the shorter arm of member 60. Thus the clutch is held in engaged position by locking the toggle slightly beyond its dead center position.

The members 59, 60 are so adjusted that, when the toggle is locked as described, the sleeve 48 will occupy a position further inwardly from the one at which the clutch elements 37, 44, 45 firmly engage. In other words, the lever 59—60 is designed to have a certain amount of overthrow. The reason for providing this overthrow is to allow for the natural wear on the engaging surfaces of the clutch elements 37, 44, 45.

In a prior Patent No. 1,753,450 there is shown a carriage return mechanism in which the clutch is operated by squeezing apart two thrust collars designated 46, 47 in the patent. As there was practically no resiliency in the friction facing of the two clutch elements shown in this patent, and the movement of the toggle past the dead center position resulted in a very slight relaxing of the pressure exerted by the driving element on the driven element, a very close adjustment of the nuts 49 in the patent was necessary to produce the proper engaging pressure, particularly in view of the small amount of movement the operating lever was capable of moving the thrust collars. As only a small amount of power is available for moving the clutch to engaging position, a force multiplying mechanism must be used whose mechanical advantage is one of force and not distance.

In the course of several years practical experience with the clutch mechanism disclosed in the patent it has been found to require frequent adjustment, often requiring the attention of a serviceman once or twice a month. This is due to the fact that only a small amount of movement of the thrust collar 46 of the patent results in engagement of the clutch hence only a few thousandths of an inch wear of the engaging surfaces is sufficient to make the clutch slip. Slippage, while not immediately enough to prevent proper return of the carriage or operation of the line space mechanism, causes the clutch facing to wear so rapidly that in a very short time the clutch slips so badly as to prevent complete return of the carriage or to cause only a partial operation of the line spacing mechanism with the result that the spacing between lines varies.

The clutch described herein has the important advantage over the one described in the patent of providing an excess of movement of the operating lever and causing the driving and driven elements to be held resiliently in engagement so that the clutch facing can wear to a considerable extent before slipping of the clutch makes necessary adjustment or replacement of the clutch facing.

It is obvious from inspection of Fig. 1 that lever 59—60 can be adjusted so the sleeve 48 can be made to overthrow quite a considerable amount and that wear on the faces of the disc 45 will only result in the spring 49 automatically taking up the lost motion between the sleeve 48 and the disc 45. In other words, the disc 45 would have to be very badly worn before the shoulder on disc 44 could engage the shoulder on sleeve 48 and prevent the disc 44 from pressing disc 45 into contact with drum 37. On the other hand, the clutch described in the patent may require service one or more times a month, depending on how frequently the machine is used, since a few thousandths of an inch wear of the clutch facing is enough to cause slippage.

An advantage of the clutch mechanism described herein is that it dispenses with the need for the ball bearings and the adjusting means on the shaft 16 of the patent, whereby the cost of the clutch mechanism is greatly reduced. The elimination of the adjusting means just mentioned makes it easier to replace the only part likely to wear to an extent sufficient to make replacements necessary during the useful life of the machine, as the driving element 45 may easily be removed by first removing screws 58 and then slipping the element 45, together with the assembly carried by sleeve 48, to the right (Fig. 1) off the shaft 20. After the worn element 45 has been replaced by a new one, the brackets 56, 57 are fastened in place and member 59 adjusted relative to member 60 to take care of the greater thickness of the new element 45.

Since the peripheral speed is greatest near the rim of the element 45, the wear is usually greatest at this point in friction clutches and there is a tendency for the rim of the element to become thinner than at points nearer the shaft 20. If the element 45 were of uniform thickness radially of shaft 20, the element 45 would tend to become convex thus reducing the area of contact and ultimately causing slippage. To reduce this effect to a minimum, both sides of the element 45 are provided with an annular recess 45a. In spite of these recesses, the total area of contact between the elements 37, 44, 45 is equal to or greater than in a two element clutch of the type shown in the patent and having only two engaging surfaces.

The clutch is engaged by power means manually controlled by a carriage return key 70 (Fig. 3) in substantially the same way as in Patent No. 1,753,450. The key 70 is pivoted at 71 and controls the engagement of a cam unit 72 with power roller 25. Cam unit 72 is connected by a link 73 to the toggle lever 66 whereby the toggle lever is actuated by said cam unit to engage the clutch as described above whenever key 70 is depressed. Since the toggle comprising lever 66 and links 67 locks the clutch in engaged position, a lever 74 controlled by the carriage is arranged to bend the toggle sufficiently beyond its dead center position to permit disengagement of the clutch when the carriage reaches a position to begin a new line as determined by the marginal stop.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination with a drive shaft, a pair of driven elements on said shaft, a driving element on said shaft between said elements, means to key said driving element to said shaft adapted to permit movement of the driving element relative to said shaft, means to interconnect said driven elements whereby the latter rotate in unison, said interconnecting means permitting one of the driven elements to move toward the other axially of the shaft and during the course of said movement engage the driving element and force the latter into engagement with the second driven element, a sleeve for slidably mounting one of the driven elements on said shaft, said sleeve having a shoulder engaging a shoulder in the driven element mounted on said sleeve, resilient means for holding said shoulders in engagement, said resilient means being operative to permit the shoulders to disengage when one of the driven elements is moved toward the other to engage the driving element, and means for moving one of said driven elements toward the other.

2. In combination with a shaft, three clutch elements mounted on the shaft, means to connect the outer two elements together for rotation in unison and for sliding of one element relative to and axially of the shaft whereby one of the outer clutch elements may be moved toward the other outer element to engage the central element and engage the latter with the other outer element to clutch all three elements together for rotation in unison, a sleeve for slidably mounting one of the driven elements on said shaft, said sleeve having a shoulder engaging a shoulder in the driven element mounted on said sleeve, resilient means for holding said shoulders in engagement, said resilient means being operative to permit the shoulders to disengage when one of the driven elements is moved toward the other to engage the driving element, and means for moving one of said driven elements toward the other.

3. In combination with a drive shaft, a pair of driven elements on said shaft, a driving element on said shaft between the driven elements, means to connect the driving element to the shaft for rotation therewith and adapted to permit longitudinal movement of the driving element on said shaft, means to interconnect the driven elements for rotation in unison whereby one of the driven elements is movable toward the other axially of the shaft and during such movement engages the driving element to force the latter into engagement with the other driven element; means to slidably mount one of the driven elements on the shaft, said mounting means having a stop portion engaging a stop portion in the driven element mounted thereon; resilient means for engaging the stop portions, said resilient means being operable to permit the stop portions to separate when the driving and driven elements have become engaged and resiliently maintain said elements in driving engagement and means to move the mounting means longitudinally of the shaft whereby to engage the driving and driven elements.

4. In combination with a shaft, three clutch elements mounted on said shaft, means to interconnect the outer two elements for rotation in unison and for sliding movement of one element relative to and axial of the shaft whereby one of the outer clutch elements may be moved toward the other outer clutch element to engage the central element and to engage the central element with the other outer element for rotation of all three in unison, a member slidably mounted on the shaft for supporting one of the outer elements and having a stop portion engageable with a stop portion in the outer element mounted thereon, resilient means for maintaining the stop portions in engagement, said resilient means when the slidable member is moved longitudinally of the shaft causing the clutch elements to be resiliently maintained in engagement, and means for moving the slidable member longitudinally to engage the clutch elements.

JAMES L. HILLIS.